United States Patent [19]
Pittie et al.

[11] 3,922,330
[45] Nov. 25, 1975

[54] SEPARATION AND PURIFICATION OF PLATINUM GROUP METALS AND GOLD

[75] Inventors: Willem Hubert Pittie, Roodepoort; Gerhardus Overbeek, Florida; Kingsley Ferguson Doig, Johannesburg, all of South Africa

[73] Assignee: Swarsab Mining, Exploration & Development Company Limited, South Africa

[22] Filed: Aug. 2, 1973

[21] Appl. No 384,826

[30] Foreign Application Priority Data

Aug. 10, 1972 South Africa................72/5490

[52] U.S. Cl. ............ 423/22; 75/108; 75/121; 75/101 BE; 75/118; 423/34; 423/24; 423/42; 423/43; 260/429 R; 260/429 J
[51] Int. Cl.$^2$ ............ C01G 55/00; C01G 7/00
[58] Field of Search ........ 75/108, 121, 118; 423/22, 423/42, 43, 34, 24; 260/429 R, 429 J

[56] References Cited
UNITED STATES PATENTS

| | | | |
|---|---|---|---|
| 2,714,555 | 8/1955 | Stevenson et al. | 423/22 |
| 3,024,084 | 3/1962 | Raper et al. | 423/22 |
| 3,679,369 | 7/1972 | Hashimoto et al, | 423/238 X |

OTHER PUBLICATIONS

Beamish, "Talanta," Vol. 5, 1960, pp. 1–35 (pp. 1–5, 11, 20–22 of particular interest).

Primary Examiner—Herbert T. Carter
Attorney, Agent, or Firm—Berman, Aisenberg & Platt

[57] ABSTRACT

A method of separating palladium from a mixture of PGMs which contains palladium and at least one other PGM, the method comprising the formation in solution of the amine complexes of the metals present with the metals being in a reduced state and precipitating out the palladium by means of dimethylglyoxime provided that where platinum is present the precipitation is effected at a pH of about 4.0 in the presence of an ammonia absorber.

14 Claims, 2 Drawing Figures

SEPARATION AND PURIFICATION OF PLATINUM GROUP METALS AND GOLD

This invention relates to the separation and purification of platinum group metals (hereinafter referred to as "PGMs") and gold and is more particularly concerned with the removal and purification of palladium from mixtures of these metals.

In general, five PGMs, namely: platinum, palladium, iridium, ruthenium and rhodium, occur together in nature with gold and these six elements must be separated from each other and purified in order to be useful in trade or industry. In general, an initial separation of these elements into two groups is effected by treating the basic mixture, which is generally a matte leach residue or sludge, with aqua regia, in which case the platinum, palladium and gold dissolve, whilst the iridium, ruthenium and rhodium remain substantially in the residue resulting from this process. The two groups of metals obtained in this manner are then subjected to generally long and complicated separation procedures in order to separate and purify the individual metals.

It is the object of this invention to provide an improved process for separating palladium, particularly from platinum, but also from other PGMs or gold, whereby palladium may be obtained more effectively and/or more easily than heretofore.

It is to be understood that whilst this specification describes basically the separation of palladium from platinum, the invention could equally well be applied to the separation of palladium from other PGMs, including rhodium, ruthenium and iridium, and/or gold.

In accordance with this invention there is provided a method of separating palladium from a mixture of PGMs and gold which contains palladium and at least one other PGM, the method comprising the formation in solution of the ammine complexes of the metals present with the metals being in a reduced state and precipitating out the palladium by means of dimethylglyoxime, provided that where platinum is present, the precipitation is effected at a pH of about 4.0 in the presence of an absorber of ammonia, such as acetic acid.

In the case where gold is present together with the PGMs, this is precipitated in the preceding recycling step and is filtered off prior to precipitation with dimethylglyoxime.

Further features of the invention provide for the metals to be reduced by boiling a solution of the nitroso chlorides thereof with hydrogen peroxide in preferably dilute nitric acid medium, for the amine complexes to be formed by the addition of excess ammonia (generally in the form of ammonium hydroxide) followed by boiling until excess ammonia has been driven off, for the precipitation of palladium to be carried out in the presence of a reagent for combining with free ammonia, and for the dimethylglyoxime to be added together with acetic acid to absorb liberated ammonia and to buffer the solution to a pH of 4.0.

The above and other features of the invention will become apparent from the following description of a process as applied to a matte sludge containing PGMs and gold, an example being embodied in the general description with quantities of reagents given in parentheses.

In this description reference will be made to the accompanying flow sheets in which.

Figure 1:
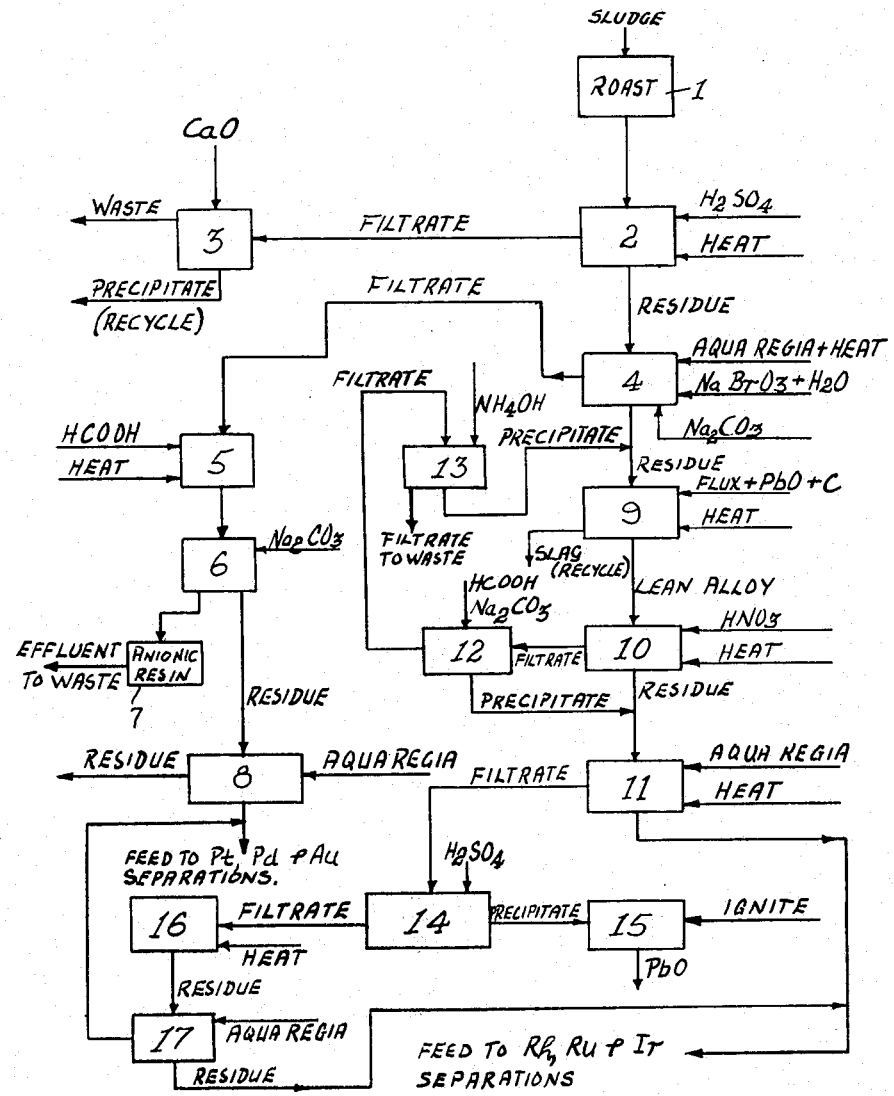
FIG. 1 is a flow sheet illustrating the basic preferred separation steps.
Figure 2:
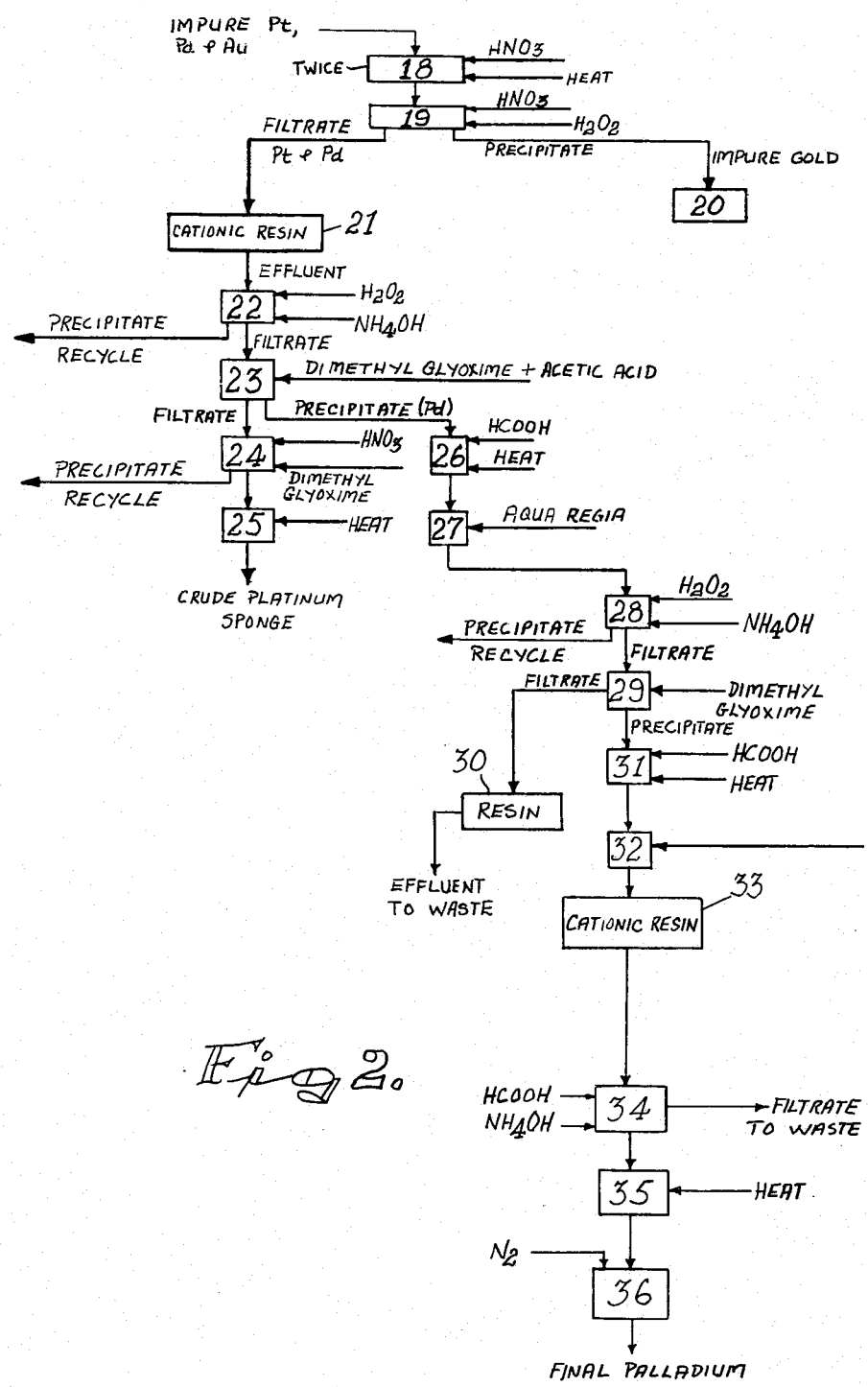
FIG. 2 is a flow sheet illustrating the separation of gold, platinum and palladium using the process of the invention.

With reference to FIG. 1, a matte leach sludge containing all five PGMs as well as gold is firstly treated in accordance with our co-pending Patent application Ser. No. 384,823 of even date entitled "Improvements in or relating to the Separation and Purification of Platinum Group Metals and Gold".

The sludge used as a starting material in this embodiment contained the following:

| Element | | % | Element | | % |
|---|---|---|---|---|---|
| Platinum | (Pt) | 6.92 | Copper | (Cu) | 6.91 |
| Palladium | (Pd) | 3.04 | Cobalt | (Co) | 0.19 |
| Gold | (Au) | 0.59 | Iron | (Fe) | 4.57 |
| Rhodium | (Rh) | 0.32 | Magnesia | (MgO) | 0.35 |
| Ruthenium | (Ru) | 0.60 | Nickel | (Ni) | 3.50 |
| Iridium | (Ir) | 0.08 | Organic matter $[Cn(H_2O)_m]$ | | 23.1 |
| | | | Potassium | (K) | 0.03 |
| Silver | (Ag) | 0.03 | Silica | $(SiO_2)$ | 12.92 |
| | | | Sodium | (Na) | 9.25 |
| Alumina | $(Al_2O_3)$ | 3.60 | Sulphur (Total) | (S) | 19.63 |
| Antimony | (Sb) | 0.05 | Tellurium | (Te) | 0.29 |
| Bismuth | (Bi) | 0.11 | Zinc | (Zn) | <0.001 |
| Calcium oxide | (CaO) | 0.49 | Other + $O_2$+ $H_2O$ | | |
| | | | | (By diff) | 3.43 |
| | | | | | 100.00 |

Firstly 2.5 kg of the sludge was roasted in a stream of air at 600°C for 2 hours in order to convert any sulphides and free sulphur to oxides at stage 1.

The roasted material was boiled at stage 2 for 2 hours with 20% $H_2SO_4$ (3 l) under reflux with stirring, cooled to ±55°C and filtered to dissolve the bulk of the base metals present.

To the filtrate calcium oxide (CaO) was added at stage 3 to precipitate all the nickel, copper, PGMs and gold in the filtrate. This precipitate was kept and contained 30 mg platinum, 100 mg palladium, 10 mg gold, 50 mg rhodium and 40 mg iridium. In practice this precipitate would be recycled to a matte smelter.

The residue obtained after the sulphuric acid treatment was then leached at stage 4 with aqua regia (1½ l) for 3 hours. This aqua regia leach and all subsequent aqua regia leachings were carried out as follows.

The material was boiled with the required amount of hydrochloric acid (HCl) under reflux for 30 minutes. The required quantity of nitric acid ($HNO_3$) was then added slowly over a period of 60 minutes. The mixture was then allowed to boil for the remaining length of time (i.e. 1½ hours).

Sodium bromate ($NaBrO_3$) (30 g) was then added to the solution which was allowed to boil for a further thirty minutes after diluting the solution with water (1.5 – 3 l) to oxidize the PGMs and gold to their highest stable oxidation states. The pH was then adjusted to 6.5 with sodium carbonate (±60°C) (1 kg) to precipitate all the metals except platinum as their hydrated oxides. The solution was allowed to stand for twenty minutes and then filtered under vacuum. The platinum was removed in this manner in order to decrease the bulk (by about 50%) of the PGMs and gold to be subjected to lead alloying.

To the filtrate [+90% of platinum (Pt) in the feed] formic acid (0.2 l) was added at stage 5 and the solution boiled under reflux with stirring for 5 hours. Sodium carbonate ($Na_2CO_3$) (0.3 kg) was added at stage 6 stage-wise over a period of 1 hour until pH 5.0 was obtained. The solution was then boiled for a further 60 minutes, cooled to 60°C and filtered under vacuum. These steps 5 and 6 were performed in order to precipitate platinum in solution.

The filtrate was passed over an anionic exchange column at stage 7 and the effluent discarded. This effluent contained 100 mg Pt, 10 mg Pd, 10 mg Au, 1 mg Rh and 25 mg Ir.

The precipitate was dissolved at stage 8 in aqua regia (1.0 l) cooled and filtered. The residue obtained was silver chloride (AgCl).

This aqua regia filtrate contained the bulk of the platinum. This platinum was combined with the bulk of the palladium and gold as described hereinafter and separation of these PGMs effected by a separate procedure.

The residue/precipitate obtained from the initial aqua regia leach and sodium carbonate precipitation at stage 4 (+1400 g) was mixed with a Flux A and a Flux B defined below and fused at stage 9 for 75 minutes at 1140°C. The result of this is that the rhodium is for the most part converted from an aqua regia insoluble form to an aqua regia soluble form. Also the solubility in aqua regia of the iridium and ruthenium is further decreased. 2.5 kg of Flux A per kg of residue and 335 g of Flux B per 100 g of PGM + Au to be collected were used. These fluxes had the following compositions:

| FLUX A (active flux) (3.5 kg) | |
|---|---|
| (1) Borax $Na_2B_4O_7$ | 20% (0.75 kg) |
| (2) Sodium carbonate $Na_2CO_3$ | 80% (2.75 kg) |
| FLUX B (Collector) (0.55 kg) | |
| (1) Litharge PbO | 90% (0.5 kg) |
| (2) Charcoal C | 10% (0.05 kg) |

The molten material was poured into iron moulds where it was allowed to cool. The lead buttons thus obtained were separated from the slag and the slag was crushed and kept but in practice would be returned to the matte smelter. The slag contained 520 mg Pt, 230 mg Pd, 45 mg Au, 24 mg Rh, 45 mg Ru (ruthenium) and 5 mg Ir.

The lead buttons were crushed and then boiled at stage 10 for 5 hours under reflux with 20% $HNO_3$ (5.5 l) in order to remove lead. The solution was cooled to 55°C and filtered under vacuum. The residue was fed to a subsequent aqua regia leach step indicated at stage 11.

Formic acid (0.05 l) was added at stage 12 to the filtrate from the nitric acid leach of stage 10 and the pH adjusted to 2.0 with sodium carbonate $Na_2CO_3$ (0.3 kg) to precipitate any PGMs and gold dissolved by the nitric acid. The solution was then stirred for 5 hours at room temperature and filtered under vacuum.

The obtained precipitate was combined with the residue obtained from the nitric acid leach step at stage 10 and fed to the aqua regia leach step at stage 11. $NH_4OH$ was added at stage 13 to the filtrate to precipitate the lead and any PGM + Au present, and this precipitate was dried - ignited and in practice would be returned to the lead fusion step at stage 9.

The combined residue/precipitate was boiled at stage 11 with aqua regia (0.75 l) for 3 hours under reflux. The solution was cooled to 55°C and filtered under vacuum. The residue formed part of the feed to the process for separating rhodium, iridium and ruthenium from each other. This residue contained 850 mg Pt, 700 mg Pd, 100 mg Au, 5000 mg Rh, 14,720 mg Ru and 1,420 mg Ir. The precious metals usually make up approximately 50% of this by-metal concentrate, the remaining 50% being lead chloride ($PbCl_2$).

To the filtrate from the aqua regia leach step at stage 11 the stoichiometric amount of $H_2SO_4$ plus a 10% excess (100 ml of 50% $H_2SO_4$) was added at stage 14 to precipitate lead present in this solution. The solution was boiled for 30 minutes, cooled to 55°C and filtered.

The precipitated lead sulphate was ignited at stage 15 to litharge (PbO) and was ready to be recycled to the lead fusion step.

The filtrate from the lead precipitation step was evaporated to dryness at stage 16 and the thus obtained salts ignited at 600°C for 2 hours. This temperature was found to be important in rendering rhodium in the residue aqua regia insoluble.

The ignition product was then boiled at stage 17 with aqua regia (0.75 l) under reflux for 3 hours. The solution was cooled and filtered under vacuum.

The residue was combined with the residue from the aqua regia leach step of stage 11 effected after alloying to give a combined feed for the separation of the secondary PGMs, namely: rhodium, ruthenium and iridium, having a PGM and gold content of 1,130 mg Pt, 850 mg Pd, 120 mg Au, 7,480 mg Rh, 14,920 Ru and 1,720 mg Ir.

The filtrate obtained from the final aqua regia leach step of stage 17 was combined with that obtained in the aqua regia leach step of stage 8 performed on the metals dissolved in the initial leach step 4 to provide a feed for separations of platinum, palladium and gold. This feed had a PGM and gold content of 171,210 mg Pt, 74,790 mg Pd, 14,560 mg Au, 200 mg Rh, 25 mg Ru and 210 mg Ir.

The feed containing the platinum, palladium and gold is thus made up of two aqua regia filtrates.

The aqua regia (1.75 l) filtrates were evaporated to dryness in Teflon dishes and the salts allowed to bake on a hotplate for 30 minutes and then evaporated to dryness with two equal portions of concentrated nitric acid (2 × 0.55 l) at stage 18 in order to obtain the nitroso chlorides.

The salts were then again baked for 30 minutes in order to remove any free hydrochloric acid at about 200°C.

The dried salts were then dissolved by boiling at stage 19 with 10% nitric acid (2 l) to obtain a 150 g/l precious metal solution. The solution was then diluted to 100 g/l precious metal with cold water (2 l – 3 l).

1 ml of $H_2O_2$ per gram of precious metal (300 ml) was then added and the solution, brought to boil again and allowed to boil for 30 minutes in order to precipitate gold as the metal. The solution was cooled to 55°C and filtered under vacuum.

The precipitate was fed to the gold purification cycle starting at stage 20.

The filtrate was diluted (3 l + 7 l) to obtain a 3% $HNO_3$ solution and then passed over Dowex 50 + 8 cationic resin at stage 21.

The resin absorbed base metals and the PGMS were washed through with enough water to obtain an effluent in which the PGM concentration equalled 33 g/l (7 l to 9 l). The effluent was heated at stage 22 to 80°C. $H_2O_2$ (0.45 l) was added to the solution to counteract any oxidation which may have taken place. The temperature was raised to 90°C and $NH_4OH$ (1.0 l) + $H_2O_2$ (0.15 l) added. The solution was then boiled for thirty minutes under reflux to form ammine complexes, after which the reflux condenser was removed and the solution boiled to expel excess $NH_3$.

The solution was cooled to 55°C and filtered under vacuum. The precipitate in practice would be recycled to the roasting step. This precipitate contained 3500 mg Pt, 10 mg Pd, 500 mg Au, 90 mg Rh, 15 mg Ru and 200 mg Ir.

According to this invention a slurry of dimethylglyoxime (0.165 kg) and acetic acid (0.225 l) was added to the filtrate at stage 23. The solution was heated to 80°C and this temperature maintained for one hour while the solution was stirred. The solution was cooled to 55°C and filtered under vacuum.

The precipitate was fed to the palladium purification cycle which is described hereinafter.

The pH of the filtrate was adjusted to 2.0 at stage 24 with nitric acid (0.1 l), a small quantity of dimethylglyoxime was added and the solution boiled under reflux until a blue precipitate (platinum dimethylglyoxime) separated out. In this regard it is to be noted that platinum precipitates in an appreciable amount at a pH of below 4.0.

The solution was cooled to 55°C and filtered under vacuum. This precipitate in practice would be recycled to the sludge roasting step, since it contained 300 mg Pt, 5 mg Pd and 2 mg Au.

The filtrate (10 l) was evaporated to dryness at stage 25 in fused silica trays under infra-red lamps. The dry ammonium salts were then ignited to crude platinum sponge at 500°C. This sponge may then be fed to a platinum purification cycle.

The precipitated palladium dimethylglyoxime had the composition 400 mg Pt, 74,755 mg Pd and 300 mg Au. This precipitate was saturated at stage 26 with formic acid (0.07 l) and ignited in a current of air at 600°C to burn off all the organic matter.

The metallic residue was then ignited at 1200°C for one hour to decompose any formed palladium oxide and any carbides. The impure palladium metal was dissolved at stage 27 in aqua regia (0.4 l). The solution was diluted with water (0.4 to 9 l) heated to 80°C and $H_2O_2$ (0.15 l) added at stage 28.

The temperature of the solution was then raised to 90°C and $NH_4OH$ (0.45 l) was added. The solution was boiled under reflux for 30 minutes after which the reflux condenser was removed and the solution boiled to expel excess ammonia. The solution was cooled to 55°C and filtered under vacuum. The precipitate which contained 50 mg Pt, 10 mg Pd and 200 mg Au would in practice be returned to the roasting step.

The filtrate was heated to 80°C at stage 29 and a dimethylglyoxime (0.165 kg) acetic acid (0.225 l) slurry added to the solution as above described. The temperature of the solution was maintained for 1 hour. The solution was cooled to 55°C and filtered under vacuum. The filtrate was passed over cationic resin Dowex 50 × 8 at stage 30 to recover any precious metals not precipitated and the effluent was discarded.

The palladium dimethylglyoxime precipitate was treated as above described by adding formic acid at stage 31 and igniting to burn off organic matter. The palladium metal thus obtained was dissolved in aqua regia (0.375 l) at stage 32.

The solution is evaporated to syrup and then diluted with water to obtain a 25 g/l solution of palladium (0.375 to 3 l). This solution was passed over cationic resin Dowex 50 × 8 at stage 33 to remove base metals and the palladium washed through with water.

HCOOH (0.075 l) was added at stage 34 to the effluent and the pH of this solution adjusted to 7.0 with $NH_4OH$ (0.1 l). The solution was boiled to precipitate pure palladium sponge which was filtered off. The filtrate contained no precious metals and was discarded.

The palladium sponge was then ignited at stage 35 at 1200°C for 1 hour and cooled in a stream of nitrogen at stage 36. This palladium has a purity of better than 99.96% and 73,340 mg palladium were recovered.

The process therefore yields a good quality product in a relatively simple manner.

What we claim as new and desire to secure by Letters Patent is:

1. In a method for separating palladium from a mixture of PGMs (platinum group metals), which contains palladium and at least one other PGM, by precipitating the palladium with dimethylglyoxime from a solution of the mixture, the improvement wherein (a) the solution is that of ammine complexes (formed in solution) of the metals and (b) said metals are in a reduced state; with the proviso that said solution is buffered at a pH of about 4.0 when platinum values are contained therein.

2. A method which comprises (a) reducing PGMs, including palladium, and gold in an initial mixture thereof, thus precipitating gold from the mixture, (b) forming ammine complexes of the PGMs (c) separating precipitated gold values from PGM values and (d) thereafter precipitating the palladium according to claim 1.

3. A method as claimed in claim 2 which comprises reducing the PGMs and gold by boiling the initial mixture in a solution of hydrogen peroxide in nitric acid medium prior to forming the ammine complexes.

4. A method as claimed in claim 2 in which the PGMs and gold in the initial mixture are in the form of their nitroso chloride complexes.

5. A method as claimed in claim 4 which comprises evaporating to dryness a mixture of chloride complexes of the PGMs and gold with nitric acid to obtain the nitroso chloride complexes of the PGMs and gold.

6. A method as claimed in claim 1 which comprises adding excess ammonium hydroxide to a solution of the metals to form the ammine complexes of the PGMs and gold.

7. A method as claimed in claim 6 which comprises boiling off excess ammonia subsequent to the formation of the ammine complexes.

8. A method as claimed in claim 1 wherein a reagent which combines with free ammonia is present in the solution while precipitating palladium with dimethylglyoxime.

9. A method as claimed in claim 8 which comprises precipitating palladium with a slurry of dimethylglyoxime and acetic acid, the latter constituting the reagent which combines with free ammonia and also one which buffers the solution to a pH of 4.

10. A method as claimed in claim 1 which furhter comprises dissolving thus-precipitated palladium and precipitating thus-dissolved palladium according to the method of claim 1.

11. A method as claimed in claim 1 in which the mixture of PGMs comprises predominantly palladium and platinum.

12. A method according to claim 1 wherein platinum is present in the mixture of PGMs.

13. A method according to claim 1 wherein the mixture is essentially free from gold and the method comprises removing any excess ammonia from the solution of ammine complexes, cooling the resulting solution, filtering out any thus-obtained insolubles to produce a filtrate, adding dimethylglyoxime to the filtrate, maintaining the resulting filtrate at an elevated temperature under agitation, cooling the thus-treated filtrate and separating precipitated palladium values therefrom.

14. A method according to claim 1 which comprises (a) preparing a solution of a mixture of PGM values, including palladium values, in which the values are in ammine complex form and the metals are in a reduced state, (b) buffering the solution at a pH of about 4.0 when it contains platinum values, and (c) precipitating the palladium values from the solution with dimethylglyoxime.

* * * * *